(12) United States Patent
Yamada (10) Patent No.: US 7,201,447 B2
(45) Date of Patent: Apr. 10, 2007

(54) SEAT RECLINING DEVICE

(75) Inventor: Yukifumi Yamada, Toyota (JP)

(73) Assignee: Aisin Seiki Kabushiki Kaisha, Kariya-Shi, Aichi-Ken (JP)

( * ) Notice: Subject to any disclaimer, the term of this patent is extended or adjusted under 35 U.S.C. 154(b) by 318 days.

(21) Appl. No.: 10/808,576

(22) Filed: Mar. 25, 2004

(65) Prior Publication Data

US 2006/0145522 A1    Jul. 6, 2006

(30) Foreign Application Priority Data

Mar. 25, 2003    (JP)    ............... 2003-083150

(51) Int. Cl.
- B60N 2/42 (2006.01)
- B60N 2/427 (2006.01)
- B60N 2/20 (2006.01)
- B60N 2/235 (2006.01)
- A47C 7/02 (2006.01)

(52) U.S. Cl. ................ 297/367; 297/216.13; 297/452.2

(58) Field of Classification Search ................ 297/367, 297/363, 216.13, 452.2, 470, 471, 472
See application file for complete search history.

(56) References Cited

U.S. PATENT DOCUMENTS

| | | | |
|---|---|---|---|
| 4,192,545 A * | 3/1980 | Higuchi et al. ........ | 297/216.13 |
| 4,541,672 A | 9/1985 | Fukuta et al. | |
| 4,804,226 A * | 2/1989 | Schmale ................ | 297/216.13 |
| 5,246,271 A * | 9/1993 | Boisset ................ | 297/452.2 X |
| 5,253,924 A * | 10/1993 | Glance ............... | 297/216.13 X |
| 5,318,341 A * | 6/1994 | Griswold et al. ... | 297/216.13 X |
| 5,362,132 A * | 11/1994 | Griswold et al. .... | 297/452.2 X |
| 5,447,360 A * | 9/1995 | Hewko et al. ...... | 297/216.13 X |
| 5,452,941 A * | 9/1995 | Halse et al. ......... | 297/452.2 X |
| 5,501,509 A * | 3/1996 | Urrutia ................. | 297/452.2 X |
| 5,564,785 A * | 10/1996 | Schultz et al. ........... | 297/452.2 |
| 5,645,316 A * | 7/1997 | Aufrere et al. ........ | 297/216.13 |
| 5,697,670 A * | 12/1997 | Husted et al. ......... | 297/216.13 |
| 5,823,627 A * | 10/1998 | Viano et al. ................ | 297/471 |
| 5,857,746 A * | 1/1999 | Barrere et al. ............. | 297/367 |
| 6,082,823 A * | 7/2000 | Aumont et al. ..... | 297/216.13 X |
| 6,244,661 B1 | 6/2001 | Timon et al. | |
| 6,543,849 B1 | 4/2003 | Yamada | |
| 6,669,296 B2 * | 12/2003 | Moriyama et al. .......... | 297/367 |

FOREIGN PATENT DOCUMENTS

DE    101 38 200 A1    2/2003
FR    2 800 250    5/2001

* cited by examiner

*Primary Examiner*—Rodney B. White
(74) *Attorney, Agent, or Firm*—Buchanan Ingersoll & Rooney PC (57) ABSTRACT

When a operation handle is operated so that one locking mechanism can be unlocked, one locking mechanism, the operation handle, the connecting mechanism and the other locking mechanism can be engaged each other and operate together, when the one seat back fixed to the seat belt is more deformed by tension of the seat belt than the other side of the seat back, any engagement among the one locking mechanism, the operation handle, the connecting mechanism and the other locking mechanism is disengaged each other so that the one locking mechanism cannot operate together with the other locking mechanism.

9 Claims, 6 Drawing Sheets

SEAT RECLINING DEVICE

This application is based on and claims priority under 35 U.S.C. §119 with respect to Japanese Application No. 2003-083150 filed on Mar. 25, 2003, the entire contents of which are incorporated herein by reference.

FIELD OF THE INVENTION

This invention generally relates to a seat reclining device for adjusting an angle of incline of a seat back relative to a seat cushion. More particularly, the present invention pertains to the seat reclining device applied to a seat device which includes a seat belt retractor in the seat back and capable of supporting load from the seat belt at either right or left side of the upper end of the seat back.

BACKGROUND OF THE INVENTION

For instance, a known seat reclining device is disclosed in U. S. patent published as U.S. Pat. No. 6,244,661. In the seat reclining device, a pair of reclining mechanisms including locking mechanisms is provided at the right and left sides of a seat device respectively. When a vehicle crashes into an object located in the front of the vehicle, the seat back is pulled toward the front side of the seat device by the seat belt connected to the upper end of the seat back, and then receives load. The pair of reclining mechanisms has enough structural strength against the load. And the reclining mechanisms are connected each other via a connecting mechanism and operated together.

Figure 8:
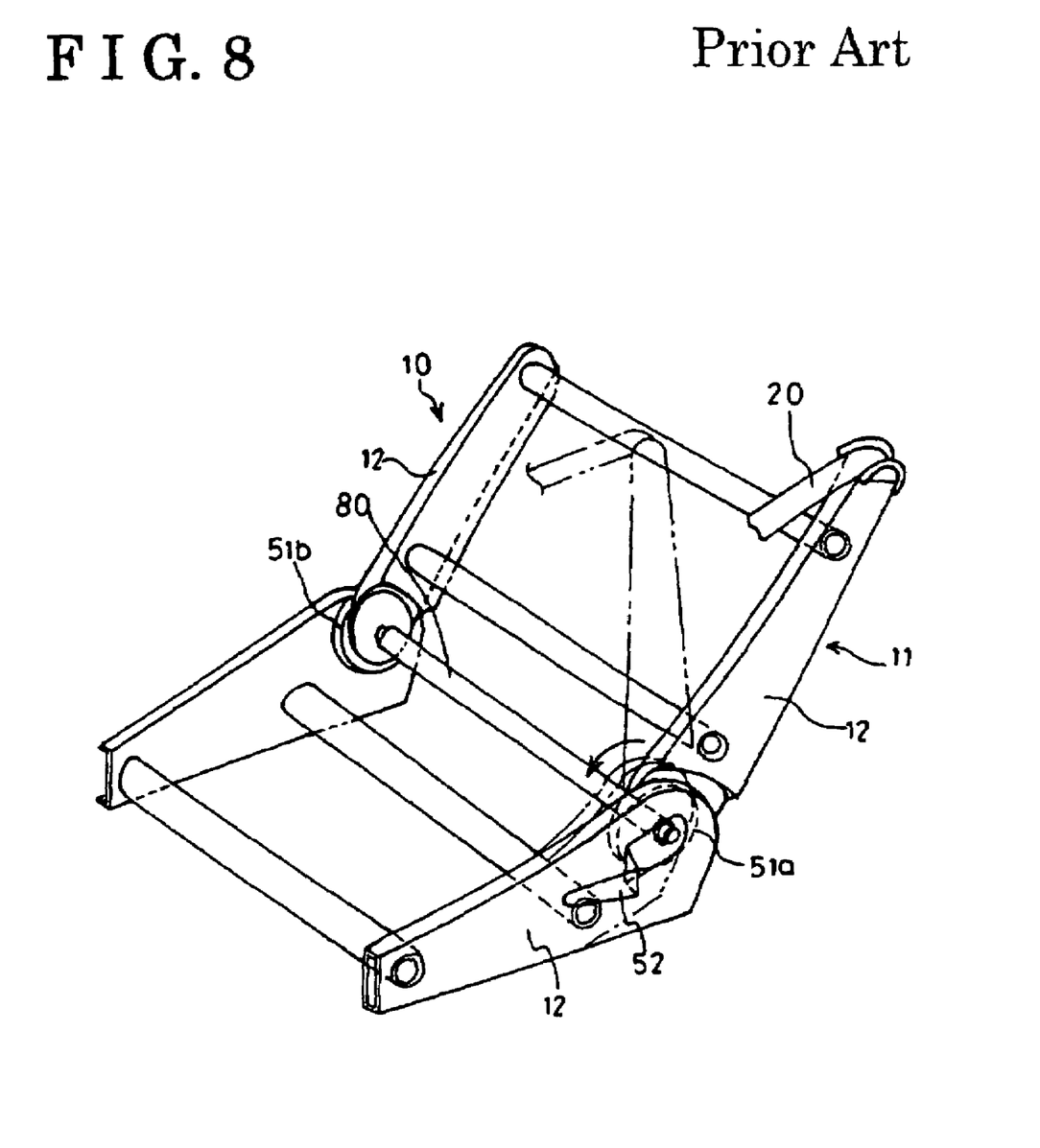
FIG. 8 shows a perspective view of a seat device including a known seat reclining device.

However, in the above-disclosed seat reclining device, torsional deformation is generated on the seat back as illustrated with chain double-dashed line in FIG. 8, because the seat back receives the load from the seat belt at the either right or left side of the upper end of the seat back. Therefore, a reclining mechanism 51a is rotated in counterclockwise direction (in an arrowed direction shown in FIG. 8 relative to a reclining mechanism 51b. Under this condition, the operation handle 52 is engaged with a connecting mechanism 80, movement of the operation handle 52 is restricted by the reclining mechanism 51b, therefore the reclining mechanism 51a is rotated in counterclockwise direction relative to the operation handle 52. Thus, the operation handle 52 is rotated in clockwise direction to the reclining mechanism 51a. And then, the locking mechanism of the reclining mechanism 51a is unlocked, an occupant cannot be sufficiently protected by the seat back.

A need thus exists to provide a seat reclining device in which a locking mechanism is not unlocked when torsional deformation is generated on the seat back, and which is capable of protecting an occupant by efficiently absorbing energy of crash with the occupant being restrained by the seat back.

SUMMARY OF THE INVENTION

According to an aspect of the present invention, a seat reclining device applied to a seat device in which a seat belt is fixed to a seat back at one side includes a pair of upper arms mounted on the seat backs, a pair of lower arms fixed to seat cushion at both sides so as to be rotatable relative to the upper arms, a pair of locking mechanisms a restricting rotation of the upper arms relative to the upper arms, a connecting mechanisms unlocking both locking mechanisms and an operation handle provided at one locking mechanism. The other locking mechanism is unlocked in response to operation of the operation handle through the connecting mechanism. Under the condition that the operation handle is operated so that one locking mechanism can be unlocked, one locking mechanism, the operation handle, the connecting mechanism and the other locking mechanism can be engaged each other and operate together. Under the condition that the one seat back fixed to the seat belt is more deformed by tension of the seat belt than the other side of the seat back, any engagement among the one locking mechanism, the operation handle, the connecting mechanism and the other locking mechanism is disengaged each other so that the one locking mechanism cannot operate together with the other locking mechanism.

According to another aspect of the present invention, a shaft included in the locking mechanisms is provided with a convex portion and a groove portion is provided at the connecting mechanism where the shaft is inserted, or convex portion is provided at the connecting mechanism where the shaft is inserted and the shaft included in the locking mechanism is provided with the groove portion so that predetermined interspace can be set between the convex portion and the groove portion.

According to still another aspect of the present invention, the connecting mechanism consists of plural link parts. When the one side of the seat back fixed to the seat belt is more deformed by tension of the seat belt than the other side of the seat back, any engagement is the plural link parts is disengaged each other with respect to one direction in which the link parts are operated.

BRIEF DESCRIPTION OF THE DRAWING FIGURES

The foregoing and additional features and characteristics of the present invention will become more apparent from the following detailed description considered with reference to the accompanying drawing figures in which like reference numerals designate like elements.

DETAILED DESCRIPTION OF THE INVENTION

Hereinafter, a preferred embodiment of the present invention will be described with reference to the accompanying drawings.

A seat reclining device 50 according to a first embodiment of the present invention is explained referring to attached FIGS. 1 to 5.

Figure 1:
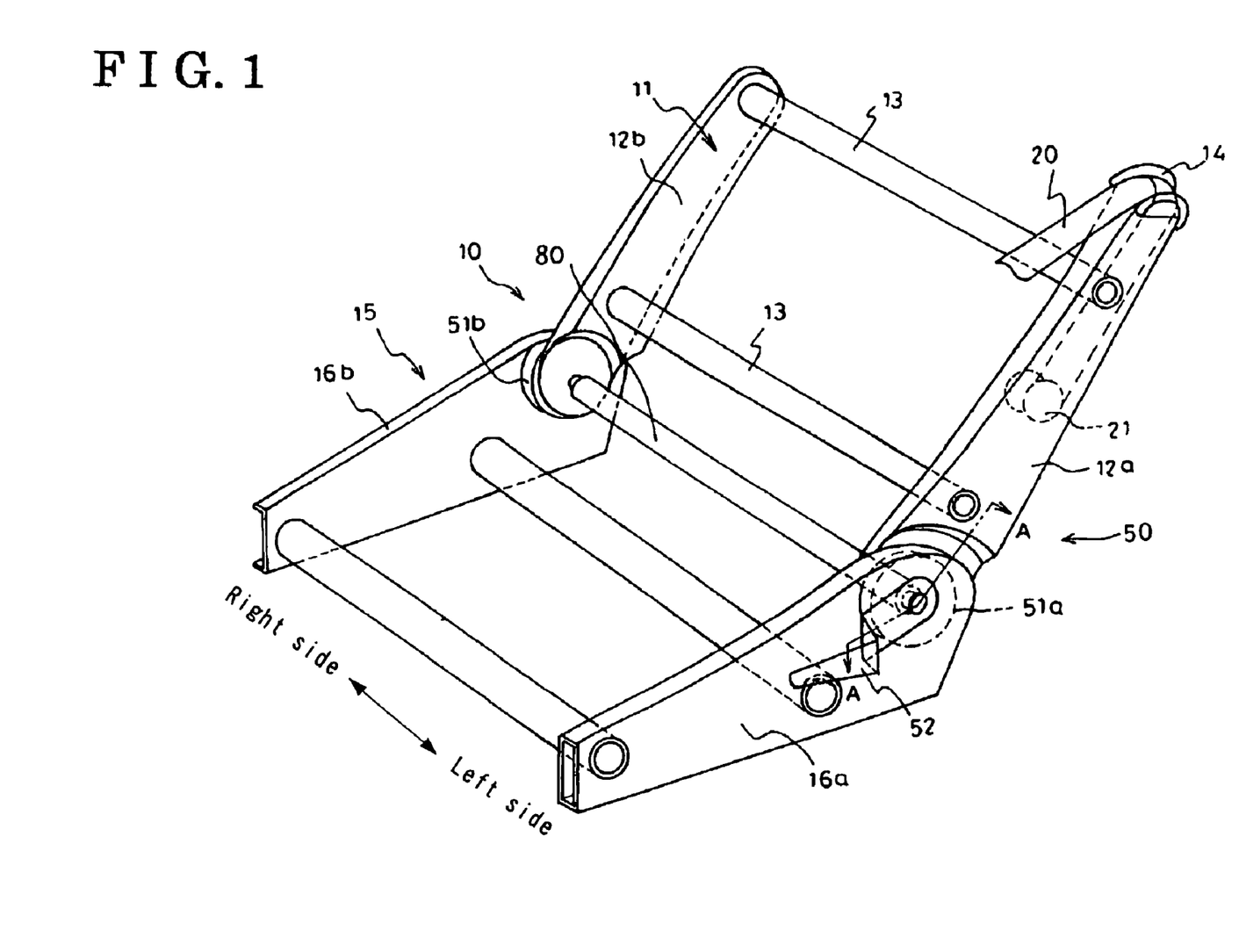
FIG. 1 shows a perspective view of a seat device including a reclining device according to a first embodiment of the present invention.

FIG. 1 shows a perspective view of a seat device 10 including the seat reclining device 50. In FIG. 1, a known cushion member, a spring and a seat fabric are not illustrated in FIG. 1. The seat device 10 includes a seat back 11 and a seat cushion 15. The seat back 11 including seat back frames 12a, 12b provided at the right and left sides (indicated by arrows in FIG. 1) and a cross member 13 which is welded to the seat back frames 12a, 12b and connects the seat back frame 12a with the seat back frame 12b. The back frame 12a is provided with a seat belt 20 and a retractor 21 for the seat belt 20.

The seat belt 20 extending from the retractor 21 is guided to the front side of the seat device 10 via a belt supporting member 14 provided at the upper end of the seat back frame 12a. The seat belt 20 is connected with a seat belt (not shown) via a buckle device (not shown), which is fixed to the cushion frames 16a, 16b provided at the right and left sides of the seat cushion 15. An occupant on the seat device 10 is restrained by the seat belt 20 which functions as a shoulder belt of three points method.

In the seat device 10, when a vehicle crashes into an object located in front of the vehicle (hereinafter referred to as a front collision) in front, the occupant is restrained relative to the seat device 10 by the seat belt 20. Under this condition, the seat belt 20 is fixed to the seat back frame 12a which receives large load than the seat back frame 12b by tension of the seat belt 20. Though the seat back frame 12a has large strength than the seat back frame 12b, since the seat back frame 12a receiving large load is more deformed than the seat back 12b, torsional deformation is inevitably generated on the seat back 11 in case of the front collision.

Two reclining mechanisms 51a and 51b having a known structure are provided between the seat back frames 12a, 16a and between the seat back frame 12b, 16b respectively. With respect to the two reclining mechanisms 51a, 51b shown in FIG. 2, basic structure is similar as will be described later, the reclining mechanism 51a fixed to the seat back frame 12a where the seat belt 20 is mounted has large strength than the reclining mechanism 51b. In the same way, the cushion frame 16a fixed to the reclining mechanism 51a has large strength than the cushion frame 16b.

Figure 2:
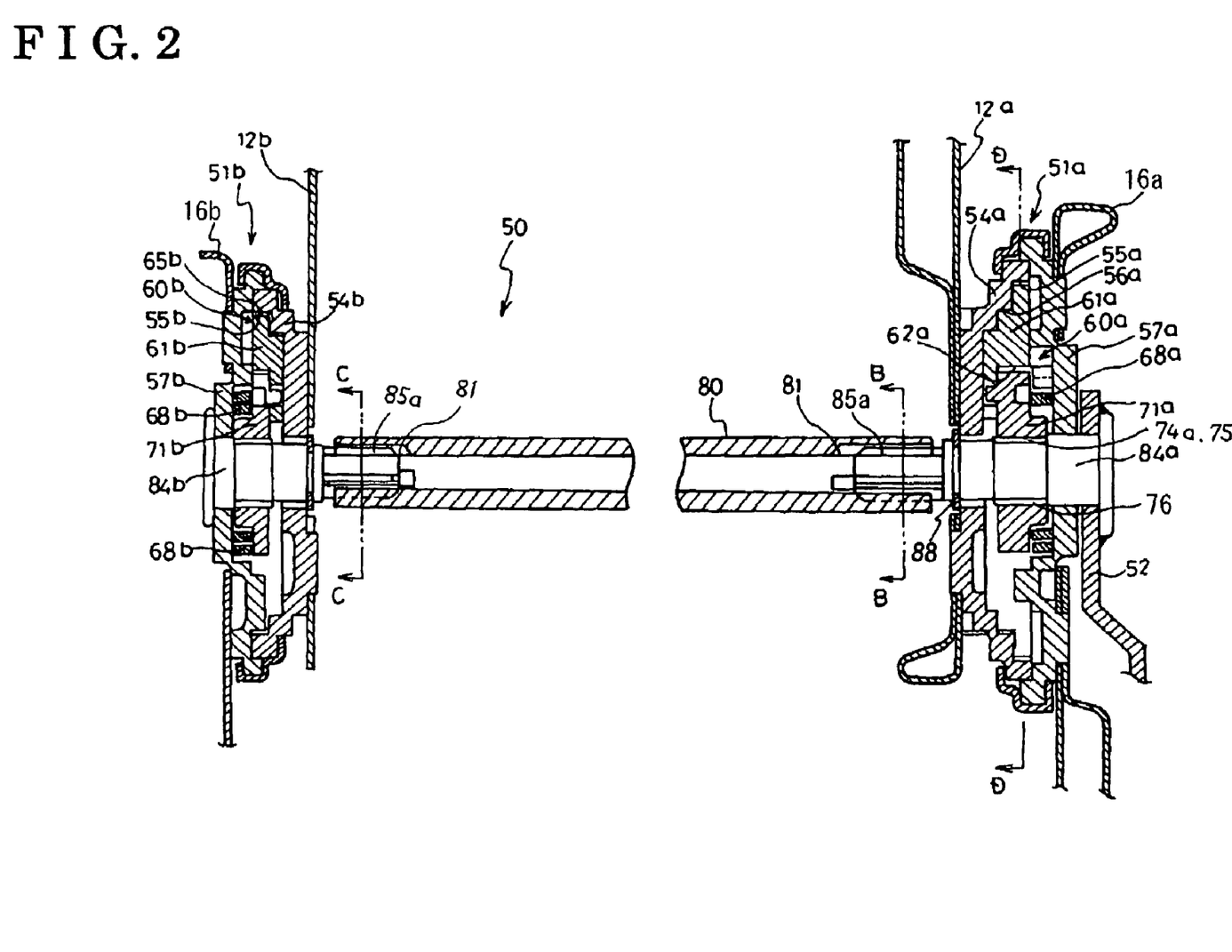
FIG. 2 shows a cross sectional view taken along the line A—A of FIG. 1.
Figure 5:
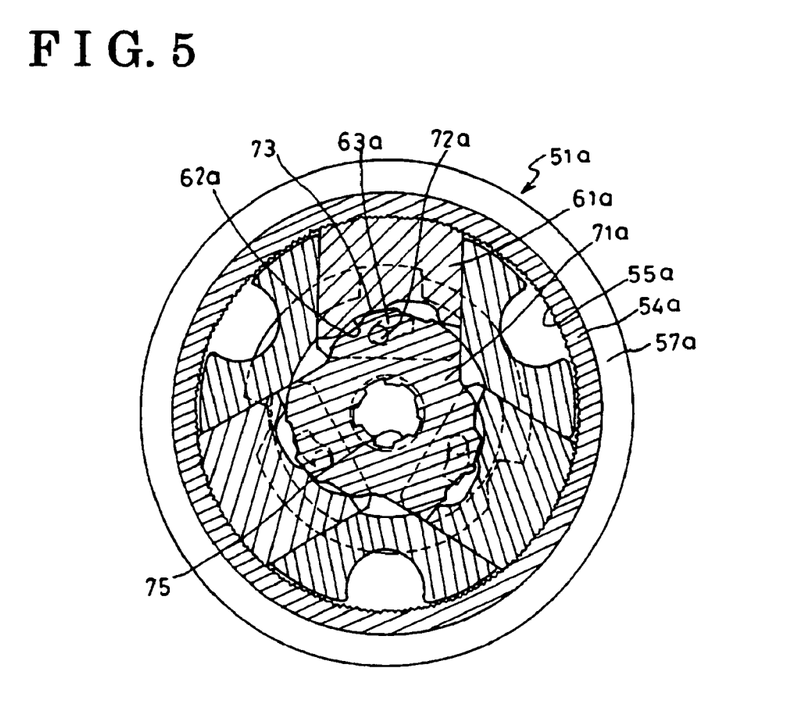
FIG. 5 shows a cross sectional view taken along the line D—D of FIG. 2.

A structure of the reclining mechanism 51a is explained referring to attached FIG. 2 and FIG. 5. The reclining mechanism 51a is provided with a disk-shaped lower arm 57a and a disk-shaped upper arm 54a. The lower arm 57a is fixed by welding on the cushion frame 16a and the upper arm 54a is fixed by welding on the seat back frame 12a. The lower arm 57a and the upper arm 54a are coaxially assembled each other. Under this state, inner circumference of dent which is formed on the lower arm 57a slidably contacts outer circumference of the upper arm 54a, and the lower arm 57a is rotatable relative to the upper arm 54a.

The upper arm 54a is provided with a first inner gear 55a and a second inner gear 56a located at the inside of the first inner gear 55a. A locking mechanism 60a is provided between the lower arm 57a and the upper arm 54a. The locking mechanism 60a includes three pawls 61a (illustrated in FIG. 5) provided at even intervals with respect to a circumferential direction of the lower arm 57a (the upper arm 54a). In each pawl 61a, the first outer gear 65a is engageable with the first inner gear 55a, and the second outer gear 66a is engageable with the second inner gear 56a. When the first inner gear 55a is engaged with the first outer gear 65a, the second inner gear 56a is also engaged with the second outer gear 66a. Under this condition, each pawl 61a is engaged with the upper arm 54a via two engaging points to ensure the strength.

As illustrated in FIG. 2 and FIG. 5, the pawls 61a is provided with a cam face 62a and a cam hole 63a, and the locking mechanism 60a further includes a cam 71a provided with a pin 72a and end face 73. The cam 71a operates the pawls 61a so that the first outer gear 65a and the second outer gear 66a of the pawls 61a can be engaged with or disengaged from the first inner gear 55a and the second inner gear 56a of the upper arm 54a by engaging with the cam face 62a and cam hole 63a via the end face 73 and the pin 72a.

As illustrated in FIG. 2, a shaft 84a is inserted into holes which are formed at the center of rotation of the lower arm 57a, the cam 71a and the upper arm 54a respectively. The shaft 84a is provided with a spline 76 on outer circumference. The spline 76 has plural grooves which open radially and extends in axial direction. A female spline 75 engaging with the spline 76 is formed on inner circumference of a shaft hole 74a of the cam 71a, and then the shaft 84a is integrally connected to the cam 71a and rotates together. A snap ring 88 provided on the shaft 84a keeps the seat reclining device 50 properly assembled.

Furthermore, an operation handle (operation member) 52 is integrally fixed by welding to one end of the shaft 84a. When the operation handle 52 is rotated in clockwise direction in FIG. 1, the cam 71a is rotated in clockwise direction in FIG. 5, and each pawl 61a is moved in direction of the shaft 84a by engaging the pin 72a of the cam 71a with the cam hole 63a. Therefore, the first and second outer gears 65a, 66a of the pawls 61a are disengaged from the first and second inner gears 55a, 56a respectively.

Figure 3:
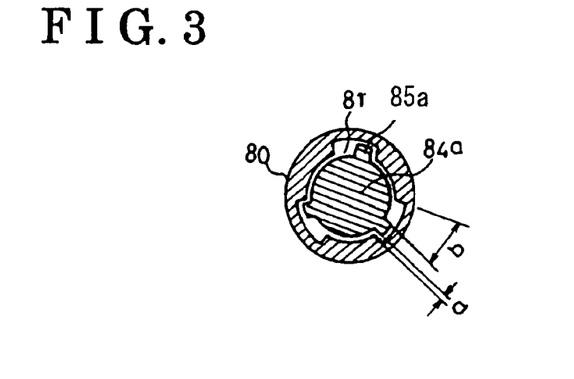
FIG. 3 shows a cross sectional view taken along the line B—B of FIG. 2.

As illustrated in FIG. 2 and FIG. 3, in the other side end of the shaft 84a, three convex portions 85a are formed on the outer circumference of the other end of the shaft 84a so as to be located at even intervals with respect to a circumferential direction. The shaft 84a is inserted into a connecting rod (connecting mechanism) 80 including three grooves 81 which is engaged with the three convex portions 85a. The connecting rod 80 extending in a width direction of the seat device 10 connects the shaft 84a with a shaft 84b of a reclining mechanism 51b provided at the opposite side of the reclining mechanism 51a with respect to the width direction of the seat device 10.

Figure 4:
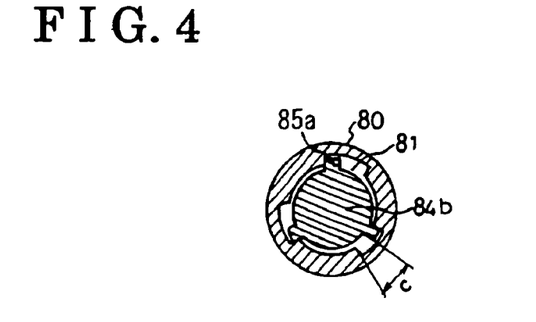
FIG. 4 shows a cross sectional view taken along the line C—C of FIG. 2.

With respect to the two reclining mechanisms 51a, 51b, a structure of the reclining mechanism 51b is similar to a structure of the reclining mechanism 51a which is described above, the reclining mechanism 51b is provided with a lower arm 57b, an upper arm 54b, pawls 61b including a outer gear 65b engaged with a inner gear 55b formed at the upper arm 54b and a locking mechanism 60b consisting of a cam 71b. As illustrated in FIG. 4, the shaft 84b of the reclining mechanism 51b is engaged with the other end of the connecting rod 80 same as the shaft 84a. Therefore, when the operation handle 52 is operated, the locking mechanisms 60a and 60b provided at the reclining mechanisms 51a and 51b respectively are coordinated each other and then the locking mechanisms 60a, 60b are unlocked. Meanwhile the reclining mechanism 60b receives small load from the seat belt 20 than the reclining mechanism 60a, therefore the locking mechanism 60b includes only the first outer gear. Further the locking mechanism 60b does not have large strength than the locking mechanism 60a, composed to be small size with a few parts.

As illustrated in FIG. 2, the reclining mechanisms 51a and 51b include springs 68a and 68b provided between the upper arm 54a and the cam 71a and between the upper arm 54b and the cam 71b. The springs 68a and 68b rotate the cams 71a, 71b in lock direction. The locking mechanisms 60a, 60b are returned from the unlocked state to locked state by action of the springs 68a and 68b.

As illustrated in FIG. 3, when the locking mechanisms 60a and 60b are locked, interspace "a" is set between an inner wall of the groove 81 of the connecting rod 80 engaged with the convex portion 85a of the shaft 84a and the convex portion 85a with respect to unlock direction in which the locking mechanism 60a is unlocked by the shaft 84a (clockwise direction in FIG. 4) and interspace "b" is set between an inner wall of the groove 81 of the connecting rod 80 engaged with the convex portion 85a of the shaft 84a and the convex portion 85a with respect to direction which is opposite to the unlock direction. As illustrated in FIG. 4, in the shaft 84b where the operation handle 52 is not provided, interspace "c" is set with respect to direction which is opposite to unlock direction in which the locking mechanism 60b is unlocked.

The interspace "a" is set as minimum as possible in size so that the locking mechanisms 60a and 60b can be completely located when locations of the cams 71a and 71b are different each other under the locking mechanisms 60a and 60b being lock. The sum of interspace "b" and interspace "c" are not to predetermined size so that the convex portion 85a of the shaft 84b cannot contact with the inner wall of the groove 81 of the connecting rod 80 by rotation of the shaft 84a in counterclockwise direction relative to the connecting rod 80 when the seat back receives load from the seat belt 20 and the torsional deformation is generated on the seat back 11. Therefore, the locking mechanism 60a is not unlocked when torsional deformation is generated on the seat back 11. If the interspace "b" or "c" will be set to be bigger, the other has not to be set.

Next, an operation of the seat device 10 as described above will be explained.

In FIG. 1, when the operation handle 52 is operated, the connecting rod 80 is rotated in clockwise direction, and then the locking mechanisms 60a, 60b of the reclining mechanisms 51a, 51b are unlocked, so that an angle of the seat back 11 can be adjusted any at desired position. And then when the operation handle 52 is released, the locking mechanisms 60a, 60b are locked by the springs 68a, 68b, and then the angle of the seat back 11 can be adjusted at desired position.

In case of front collision, the seat back 11 receives large load from the seat belt 20, and then torsional deformation is generated on the seat back 11 as illustrated with chain double-dashed line in FIG. 8. However the convex portions 85a of the shafts 84a, 84b of the reclining mechanisms 51a, 51b are rotated within the interspace "b" and "c" so that the convex portion 85a of the shaft 84b cannot contact with the inner wall of the groove 81 of the connecting rod 80, so that the locking mechanisms 60a, 60b can be locked. The seat back frames 12a, 12b and the seat cushion frames 16a, 16b, which are capable of changing the shape with the occupant being restrained and capable of cushioning the shock against the occupant by efficiently absorbing energy of crash.

As evidenced by comparing the first embodiment of the present invention to an known reclining device as illustrated in FIG. 8, the seat reclining device 50 is simple in structure without additional parts and can keep locked state of the locking mechanisms as described above.

Figure 6:
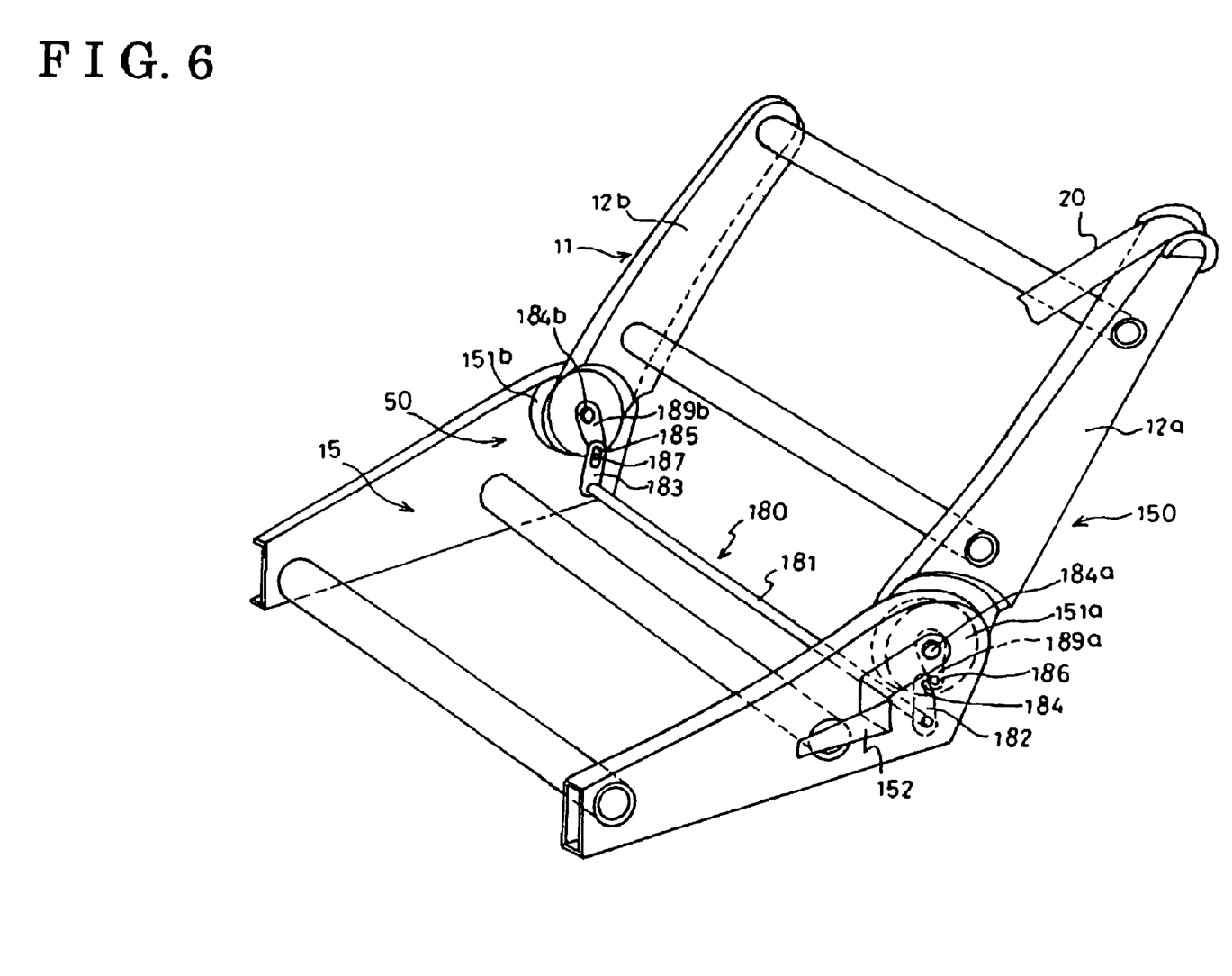
FIG. 6 shows a perspective view of a seat device including a reclining device according to a second embodiment of the present invention

Next, a seat reclining device 150 according to second embodiment of the present invention is explained referring to attached FIG. 6.

A reclining mechanism 151a including an operation handle 152 provided at a seat back frame 12a supporting a seat belt 20 is similar to the above the first embodiment. Operation of the operation handle 152 are transmitted to a shaft 184a of the reclining mechanism 151a, a transmitting member 189a fixed at the shaft 184a, a pin 186 fixed at the transmitting member 189a, a arm 182 fixed at one edge of a connecting rod 181, a arm 183 fixed at the other edge of the connecting rod 181, a pin 187, the transmitting member 189b including the pin 187, and a shaft 184b of the reclining mechanism 151b including the transmitting member 189b. The pin 186 is contacted with a contacted groove 184 of the arm 182 only when the operation handle 152 is operated in unlock direction (in clockwise direction in FIG. 6) of lock mechanism (not shown) of the reclining mechanism 151a. Therefore, when the arm 182 is rotated in counterclockwise direction, the transmitting member 189b is rotated in clockwise direction via the pin 187 by an elongated 185 formed at the arm 183, and then a locking mechanism (not shown) of the reclining mechanism 151b is unlocked. However, when torsional deformation is generated on the seat back frame 12a, the reclining mechanism 151a is rotated in counterclockwise direction relative to a transmitting mechanism 180, the locking mechanism (not shown) of the reclining mechanisms 151a, 151b are not unlocked because the pin 186 is not contacted with the contacted groove 184.

Figure 7:
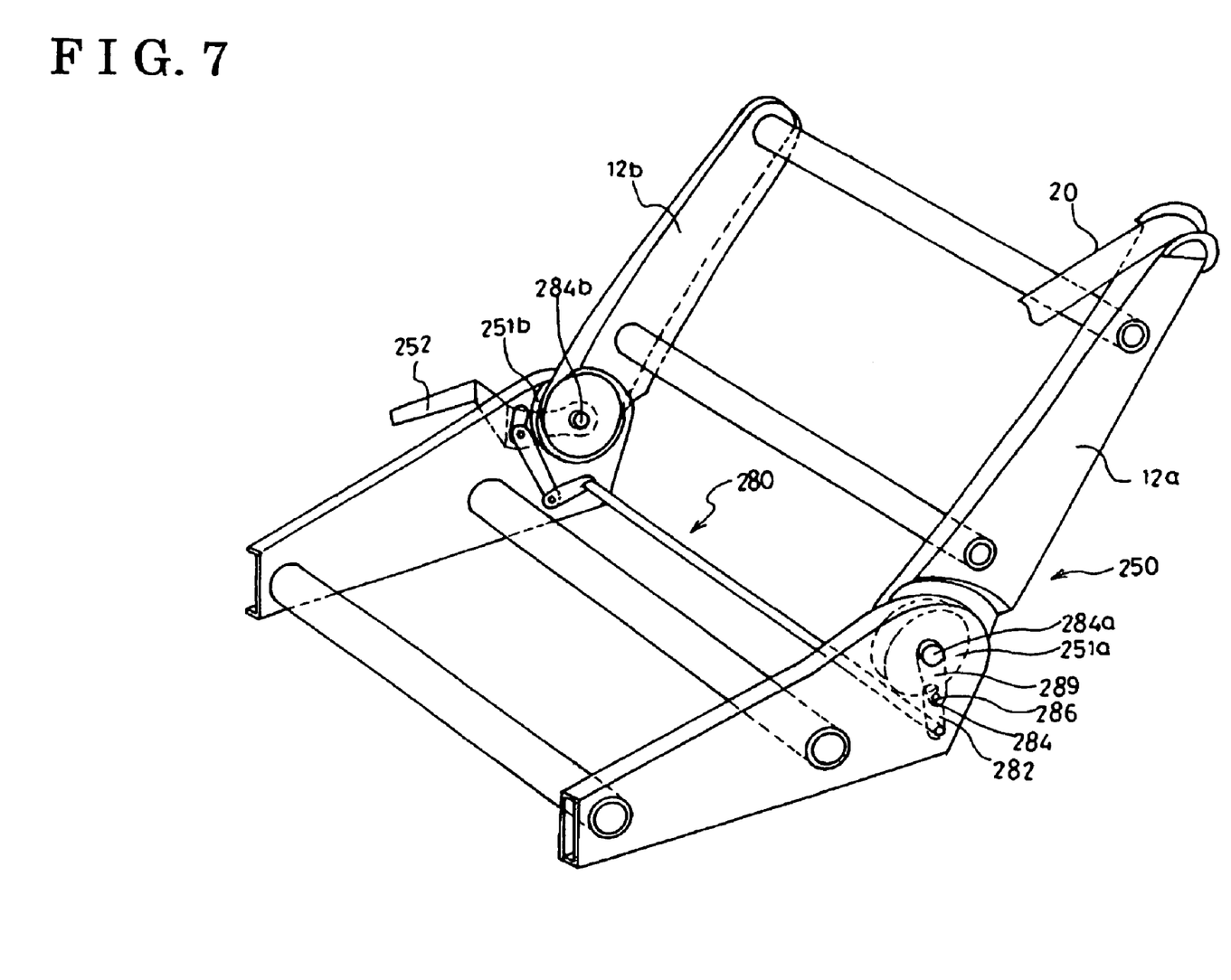
FIG. 7 shows a perspective view of a seat device including a reclining device according to a third embodiment of the present invention.

Furthermore, a seat reclining device 250 according to a third embodiment of the present invention is explained referring to attached FIG. 7.

An operation handle 252 is provided at the other side relative to the second embodiment. Therefore, the operation handle 252 is fixed at a shaft 284b of a reclining mechanism 251b which is provided at a side of the seat back frame 12b not including a seat belt 20. An operation of the operation handle 252 is transmitted to a shaft 284a of the reclining mechanism 251a via a connected rod 280. A locking mechanism (not shown) of a reclining mechanism 251a is unlocked when a transmitting member 289 is rotated in counterclockwise direction. When an arm 282 of the connecting rod 280 is rotated in clockwise direction, a pin 286 fixed at the transmitting member 289 contacts with a contacted groove 284 of the arm 282 in order to rotate a transmitting member 289 in counterclockwise direction. However, when torsional deformation is generated on the seat back frame 12a, the reclining mechanism 251a is rotated in counterclockwise direction, the pin 286 is not in contact with the contacted groove 284. The seat reclining device 250, which is capable of protecting an occupant by efficiently absorbing energy of the crash with the occupant being restrained by the seat back and which capable of cushioning the shock against the occupant same as the first and second embodiment of the present invention.

As described in the second and third embodiments of the present invention, plural link parts are used at the connecting rod. Therefore an operation handle can be set at each side of the seat device and then a design freedom can be ensured.

The seat device including the seat belt fixed at one-side of the seat back frame has torsional deformation, the locking mechanisms 60a, 60b of right and left sides of the reclining mechanisms keep locked state. The seat back frames and the seat cushion frames, which are capable of changing the shape with the occupant being restrained and capable of cushioning the shock against the occupant by efficiently absorbing energy of crash.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A seat reclining device in which a seat belt is fixed to a seat back at one side comprising:
   a pair of upper arms mounted on the seat back;
   a pair of lower arms fixed to a seat cushion at both sides, with the upper arms being rotatable relative to the lower arms;
   a pair of locking mechanisms restricting a rotation of the upper arms relative to the lower arms;
   a connecting mechanism unlocking both locking mechanisms;
   an operation handle provided at one locking mechanism;
   the other locking mechanism being unlocked in response to operation of the operation handle through the connecting mechanism,
   under the condition that the operation handle is operated to unlock one locking mechanism, the one locking mechanism, the operation handle, the connecting mechanism and the other locking mechanism are engageable with each other to operate together, and under the condition that the one side of the seat back fixed to the seat belt is more deformed by tension of the seat belt than the other side of the seat back, any engagement among the one locking mechanism, the operation handle, the connecting mechanism and the other locking mechanism is disengaged so that the one locking mechanism cannot operate together with the other locking mechanism.

2. A seat reclining device according to claim 1, wherein a shaft included in the locking mechanisms is provided with a convex portion and a groove portion is provided at the connecting mechanism where the shaft is inserted, or the convex portion is provided at the connecting mechanism where the shaft is inserted and the shaft included in the locking mechanism is provided with the groove portion so that a predetermined interspace is set between the convex portion and the groove portion.

3. A seat reclining device according to claim 1, wherein the connecting mechanism comprises plural link parts, and when the one side of the seat back fixed to the seat belt is more deformed by tension of the seat belt than the other side of the seat back, any engagement in the plural link parts is disengaged from each other with respect to one direction in which the link parts are operated.

4. A seat reclining device according to claim 1, wherein each of the locking mechanisms comprises a respective shaft, each of the shafts being engaged with the connecting mechanism so that the shafts and the connecting mechanism are rotated by the operation handle, and a predetermined interspace is set between each shaft and the connecting mechanism to permit relative rotation between the connecting mechanism and each shaft, the predetermined interspace between the shaft of the one locking mechanism and the connecting mechanism being set in an unlock direction in which the one locking mechanism is unlocked, and the predetermined interspace between the shaft of the other locking mechanism and the connecting mechanism being set in a direction which is opposite the unlock direction in which the other locking mechanism is unlocked when the both locking mechanisms are locked.

5. A seat reclining device according to claim 1, wherein the one locking mechanism comprises a first shaft and the other locking mechanism comprises a second shaft, and the connecting mechanism comprises an elongated rod having opposite ends each fitted to one of the shafts, one of the rod and first shaft including convex portions and the other of the rod and first shaft including groove portions that each receive a respective one of the convex portions, and an interspace between each convex portion and the respective groove portion such that a distance between the convex portion and a facing surface of the groove portion in one rotational direction is greater than the distance between the convex portion and the facing surface of the groove portion in an opposite rotational direction.

6. A seat reclining device according to claim 1, wherein each of the locking mechanisms includes a respective shaft engaged with the connecting mechanism, further comprising first convex portions provided on either the connecting mechanism or the shaft of the one locking mechanism, and first groove portions provided on the other of the connecting mechanism and the shaft of the one locking mechanism, the first convex portions being received in the first groove portions with predetermined interspaces being set between the first convex portions and the first groove portions to permit relative rotation between the connecting mechanism and the shaft of the one locking mechanism, further comprising second convex portions provided on either the connecting mechanism or the shaft of the other locking mechanism, and second groove portions provided on the other of the connecting mechanism and the shaft of the other locking mechanism, the second convex portions being received in the second groove portions with predetermined interspaces being set between the second convex portions and the second groove portions to permit relative rotation between the connecting mechanism and the shaft of the other locking mechanism, the shafts and the connecting mechanism being rotated together by the operation handle, the predetermined interspaces between the first groove portions and the first convex portions being set in an unlock direction in which the one locking mechanism is unlocked, land the predetermined interspaces between the second groove portions and the second convex portions being set in a direction which is opposite to the unlock direction in which the other locking mechanism is unlocked when both locking mechanisms are locked.

7. A seat reclining device in which a seat belt is fixed to a seat back at one side comprising:
   a pair of upper arms mounted on the seat back;
   a pair of lower arms fixed to a seat cushion at both sides, with the upper arms being rotatable relative to the lower arms;
   a pair of locking mechanisms restricting rotation of the upper arms relative to the lower arms;
   an operation handle provided at one of the locking mechanisms;
   a connecting mechanism connected to both locking mechanisms to permit both locking members to be unlocked in response to operation of the operation handle;
   under the condition that the operation handle is operated to unlock one locking mechanism, the one locking mechanism, the operation handle, the connecting mechanism and the other locking mechanism are engageable with each other to operate together, and under the condition that the one side of the seat back fixed to the seat belt is more deformed by tension of the seat belt than the other side of the seat back, any engagement among the one locking mechanism, the operation handle, the connecting mechanism and the other locking mechanism is disengaged so that the one locking mechanism cannot operate together with the other locking mechanism.

8. A seat reclining device according to claim 7, wherein the connecting mechanism includes a connecting rod connected to both locking mechanisms.

9. A seat reclining device in which a seat belt is fixed to a seat back at one side comprising:
 a pair of upper arms mounted of the seat back;
 a pair of lower arms fixed to seat cushion at both sides, with the upper arms being rotatable relative to the lower arms;
 a pair of locking mechanisms restricting rotation of the upper arms relative to the lower arms;
 a connecting mechanism unlocking both locking mechanisms;
 an operation handle provided at one of the locking mechanisms;
 the other locking mechanism being unlocked in response to operation of the operation handle through the connecting mechanism;
 under the condition that the operation handle is operated to unlock one locking mechanism, the one locking mechanism, the operation handle, the connecting mechanism and the other locking mechanism are engageable with each other to operate together, and under the condition that the one side of the seat back fixed to the seat belt is more deformed by tension of the seat belt than the other side of the seat back, any engagement among the one locking mechanism, the operation handle, the connecting mechanism and the other locking mechanism is disengaged so that the one locking mechanism cannot operate together with the other locking mechanism;
wherein the connecting mechanism comprises plural link parts, and when the one side of the seat back fixed to the seat belt is more deformed by tension of the seat belt than the other side of the seat back, any engagement in the plural link parts is disengaged from each other with respect to one direction in which the link parts are operated.

* * * * *